Patented July 19, 1938

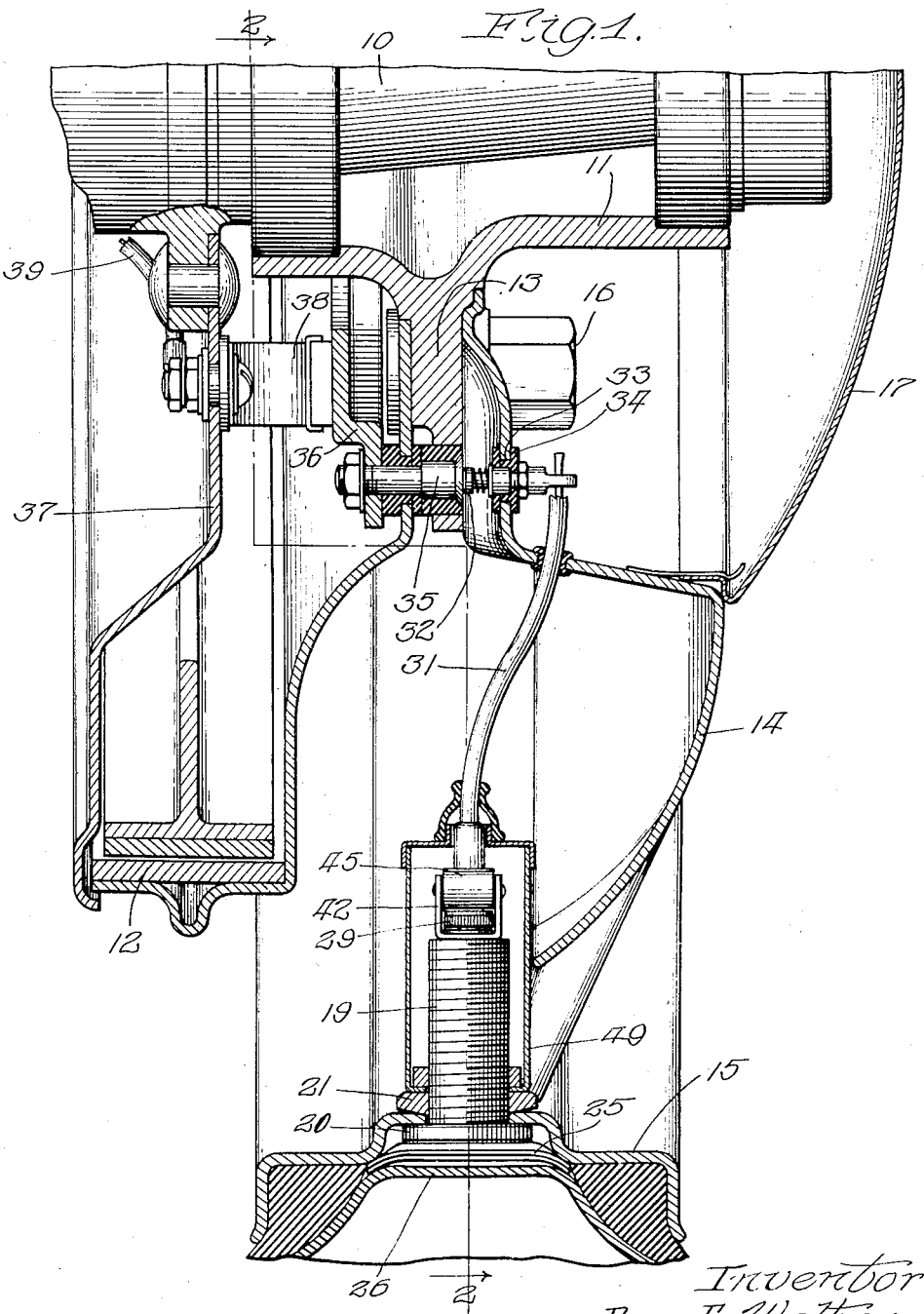

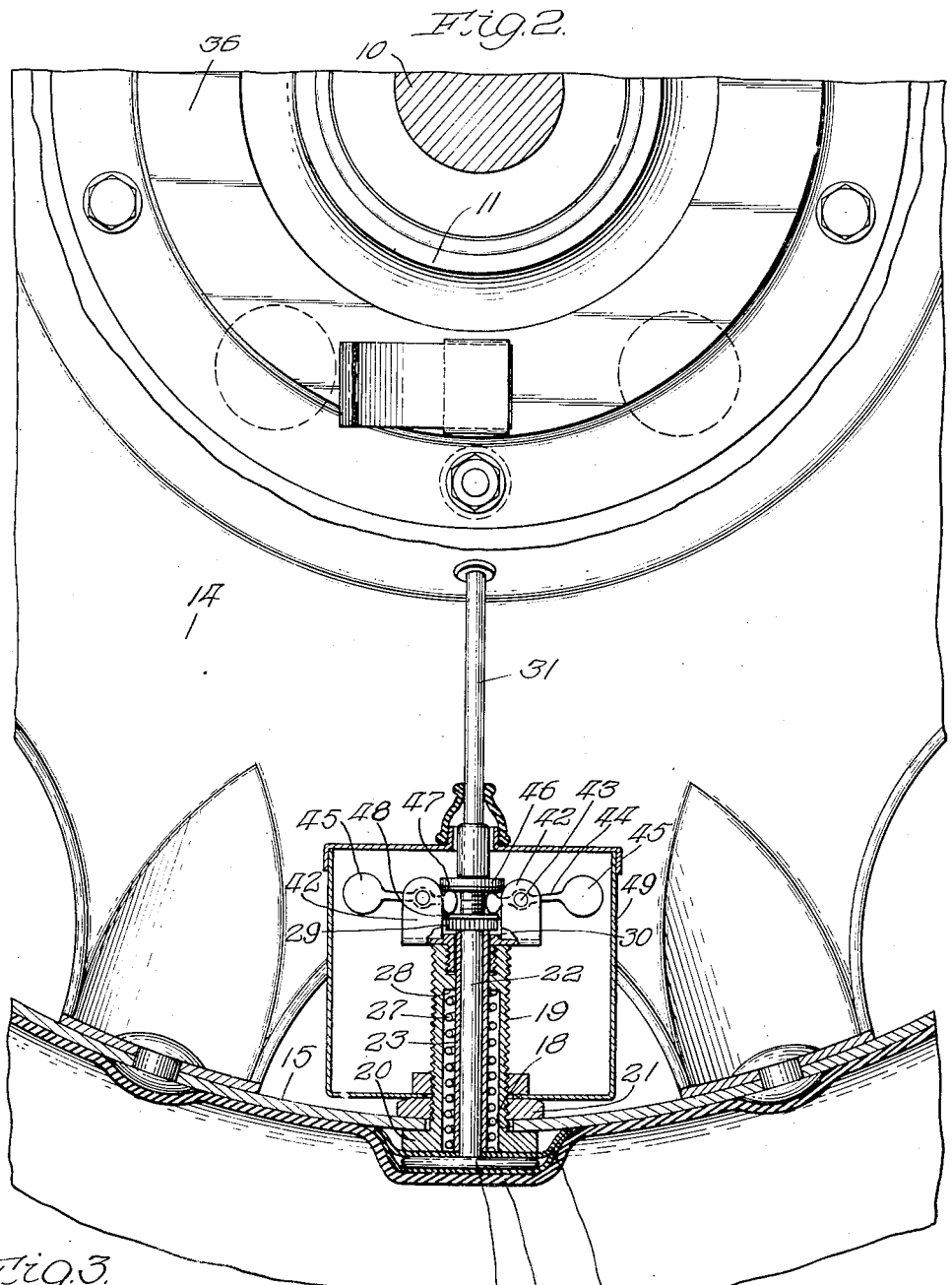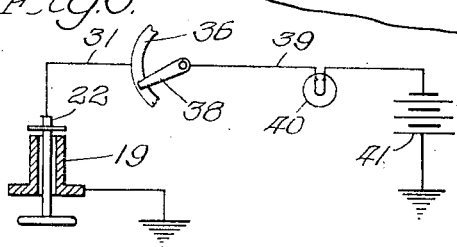

2,124,380

UNITED STATES PATENT OFFICE 2,124,380

TIRE PRESSURE INDICATOR

Ray E. Walters and Clarence E. Ruch, Nappanee, Ind.

Application October 26, 1936, Serial No. 107,670

5 Claims. (Cl. 200—58)

This invention relates to a tire pressure indicator, and more particularly to a device for giving an indication to the driver of a vehicle when one of the tires thereof drops below a certain desired minimum pressure.

One feature of this invention is that it gives an indication to the driver of a vehicle, while the vehicle is in motion, that the pressure in one tire thereof has dropped below the desired minimum; another feature of this invention is that its operation is not affected by centrifugal force and is therefore independent of the speed of the vehicle; still another feature of this invention is that the wheel of a vehicle equipped with this device may be removed and replaced without any other operation than would be necessary if the wheel were not so equipped; a still further feature of this invention is that it prevents rim cuts, blow outs, and the like which are the result of an under inflated tire; other features and advantages of this invention will be apparent from the following specification and the drawings, in which—

Figure 1 is a fragmentary transverse sectional view of a wheel equipped with this device; Fig. 2 is a view, partly in section, at right angles to Fig. 1 and along line 2—2 thereof; and Fig. 3 is a schematic diagram of the electrical connections.

Much of the damage done to pneumatic tires in the operation of a vehicle, such as blow outs, rim cuts, stone bruises, and the like is the result of under inflation of the tire. Road shocks which under normal inflation would be absorbed by the tire without any damage whatsoever cause breakage of cords, side walls, and other difficulties when the air pressure existing within the tire is below the proper pressure, since in that case road shocks must be absorbed by the body of the tire rather than by the air therein. This is especially true in the case of modern tires, since the normal driving pressure has been constantly reduced until the recommended pressure for the average is now around twenty-five pounds per square inch, or even lower. Under such circumstances, a five pound drop in pressure is sufficient to render the tire liable to serious damage from normal road shocks.

While tire manufacturers and automobile service men generally carry on a campaign to make people aware of the dangers of under inflated tires, the average driver will not take the trouble to check the pressure of his tires at frequent intervals, such as every couple of days. Even where a driver is willing to take this time and trouble, it frequently happens that a nail or other object punctures a tire during road operation, causing a slow leak which soon reduces the pressure in the tire below the minimum. It is thus highly desirable to have some device in connection with the pneumatic tire of a vehicle which can be adjusted to a pre-determined desired minimum pressure, and which will give an indication to the driver of the vehicle when the pressure in the tire drops below that value. While various devices have heretofore been known which attempt to accomplish this result, they have all had various serious defects. The two principal objections to present devices are that they are affected by centrifugal force and thus by the speed of the car, and that they require additional operations when a wheel is removed, as to change a tire.

The present invention disclosed herewith obviates these and other objections by providing a device on the rim of the wheel which is operable by the pressure existing within the tire and which is so wired and connected that it causes an indicator lamp, preferably mounted on the dashboard of a car, to light when the pressure existing in the tire falls below the desired amount. This device is provided with balancing weights so arranged that the effect of centrifugal force on the contact member at various speeds is neutralized, and the circuit is closed at the same pressure value, regardless of the speeds at which the car is travelling. The device is also provided with spring-pressed contact means between the wheel proper and the mounting hub, so arranged that the wheel may be removed and replaced merely by the usual holding studs or bolts, with no additional operation being necessary to make or break the circuit between the device on the wheel and the remainder of the circuit mounted on the car proper.

In the particular embodiment of the invention disclosed herewith the axle 10 of the vehicle has mounted thereon on suitable bearings a rotatable hub 11 provided with the usual brake drum 12 and mounting plate 13 for a wheel. The wheel 14 is here shown as provided with a rim 15 and mounted on the mounting plate 13 by the studs or bolts 16. The recess in wheel 14 provided for the mounting bolts 16 and the axle 10 is covered with the usual hub cap 17.

The rim 15 has therethrough an opening 18 through which is mounted a metal tube 19 having a shoulder 20 beneath the rim and a locking or holding nut 21 threaded thereon into tight engagement with the top of the rim 15. The tube 19 has extending therethrough a rod or stem 22 insulated therefrom by a tube 23 of dielectric material. The stem 22 is longitudinally slidable within this tube 23 and thus with respect to the tube 19. The bottom of the stem extends beneath the shoulder 20 of the tube 19 and is provided with a base member 24 covered by a protecting member 25, as of rubber. This base member is adapted to contact directly the inner tube 26 of the pneumatic tire, and to be held up in a raised position by the fluid pressure existing within the inner tube. The tube 19 has mounted therein, around the stem 22, a spring 27 which has one end thereof pressing against the base member 24 at the bottom of the stem, and the other end against a suitable shoulder 28 provided within the tube 19. This spring tends to counteract the pressure existing within the tire, and it forces the stem 22 downwardly, speaking with respect to the design in which the wheel is illustrated. The stem 22 is provided near the top thereof, outside of the tube 19, with a contact 29 threaded thereon. The contact 29 is here shown as slightly spaced from a cooperating contact shoulder 30 on the top of the tube 19, the spacing being adjustable by rotation of the contact 29. When the pressure in the tire drops below the minimum for which the device has been set, the spring 27 exerts a stronger downward thrust than the air pressure existing against the bottom of the base member 24 and thus the stem 22 moves downwardly under the influence of the spring. This makes contact between the members 29 and 30, and completes a circuit between the stem 22 and the rim 15, which is, of course, grounded to the frame of the car through the axle 10.

Referring more particularly to Fig. 1, it will be seen that the stem 22 is electrically connected by the insulated wire 31 to the spring-pressed plunger 32 mounted through an opening 33 in the wheel 14 but insulated electrically therefrom by the washer 34. The plunger 32 makes contact with the bolt 35 extending through the mounting plate 13 to a point within the brake drum 12, where it terminates in electrical and mechanical connection with a contact ring 36. Both the bolt 35 and the contact ring 36 are insulated, as shown, from the mounting plate 13 and the brake drum, so that there is no electrical connection between the contact ring and the frame of the car. A backing plate 37 for the brake drum has mounted thereon a contact strip or brush 38 adapted to make sliding contact with the ring 36 as the wheel rotates. The brush 38 is also so mounted as to be electrically insulated on the backing plate 37, and has connected thereto a wire 39 which runs along the frame of the car to some suitable point, not here shown, as the dashboard thereof.

Referring more particularly to the schematic diagram shown in Fig. 3, it will be seen that the wire 39 makes connection with one side of a lamp 40 or other indicator means mounted on the dashboard, the circuit being completed through the battery 41 to ground. It is thus readily apparent that when the stem 22 makes electrical contact with the tube 19 through the contacts 29 and 30, as the result of drop in pressure in the tire, a circuit is completed which causes the indicator means 40 to be energized. Since this indicator is preferably mounted on the dashboard of the car, it immediately calls the attention of the driver to the fact that one of the tires is under inflated, so that the driver is warned to stop and examine the condition. In view of the timely warning, there will almost always be sufficient air in the tire to permit the car to be carefully driven to the next service station, where the tire may be pumped up and any cause of loss of pressure, as a puncture or poor valve, may be fixed. While only one wheel and circuit is here shown, it is readily apparent that the device is intended for use on each of the wheels of a vehicle, and even on the wheels of any trailers or the like, pulled by the said vehicle. Independent indicating means 40 may be used for each of the wheels, or all of the wires 39 may be connected in parallel to one indicator. While independent circuit and indicating means enable a driver to know at once which tire is soft, it is generally sufficient if one indicator is used, since visual examination of the tires at the next stop will generally show which has low pressure.

In order to neutralize the effect of centrifugal force which would otherwise tend to move the stem 22 downwardly when the wheel revolves, the tube 19 is here shown provided at the top thereof with a pair of brackets 42. These brackets have pivotally mounted therein at 43 short levers 44 enlarged into counterbalancing weights 45 at the ends thereof. The inner ends of the levers 44 are engaged in a recess provided between the contact 29 and another shoulder 46 on the stem 22. Insulating washers 47 and 48 are provided so that there is no electrical connection between the stem 22 and the inner ends of the levers 44. The effective weight of the counterbalancing weights 45, that is their actual weight exerted through the leverage 44, is so chosen that the weight of the stem 22 is balanced thereby. The centrifugal force resulting from rotation of the wheel tends to throw both the stem 22 and the weights 45 downwardly, again speaking with respect to the position of the device illustrated herewith, but since the force exerted on the counterbalancing weights 45 is reversed into an upward force by the levers 44, any tendency of the stem 22 to move as a result of rotation of the wheel is neutralized. This has been found to be of considerable importance, since without any counterbalancing means the stem 22 is so acted upon by centrifugal force that at good road speed of the car it moves downwardly, against the pressure existing in the inner tube 26, and closes the circuit to the contacts 29 and 30 even though the pressure in the tire is several pounds above the minimum for which the device is set when it rests. The present structure obviates this defect, and the contact is completed at the same pressure regardless of whether the car is standing still or moving at high speed. In order to protect the moving parts of the device from the effects of corrosion, dirt and the like, a cover 49 is here shown enclosing it.

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as permissible, in view of the prior art.

We claim:

1. A pressure responsive switch for the tire on a wheel of a vehicle adapted to energize indicating means within said vehicle, including: tube means mounted on said wheel; a stem within said tube adapted to be acted upon by the pressure existing within said tire; a pair of contacts adapted to be closed when said stem moves as a result of a drop in pressure in said tire below a predetermined desired amount; and means operatively connected to the stem and responsive to centrifugal force for neutralizing the effect of centrifugal force on said stem when said wheel is rotated.

2. Apparatus of the character claimed in claim 1, wherein said last mentioned means comprises a counterbalancing movable weight.

3. A pressure responsive switch for a tire on the wheel of a vehicle adapted to complete a circuit including an indicating means within said vehicle, including: a tube mounted through an opening in the rim of said wheel; a stem in said tube having one end thereof extending within said tire, whereby the pressure in said tire forces said stem toward the center of said wheel; spring means for forcing said stem away from the center of said wheel; a pair of normally open contacts adapted to be closed when said stem moves away from the center of said wheel; and a weight on said tube having operative engagement with said stem, whereby the effect of centrifugal force on said stem is neutralized.

4. A pressure responsive switch for the tire on the wheel of a vehicle adapted to complete a circuit for energizing an indicating means within said vehicle, including: a tube mounted through an opening in the rim of said wheel; a stem within said tube projecting into said tire, whereby the pressure in said tire forces said tube toward the center of said wheel; spring means adapted to move said stem in a direction away from the center of said wheel; a contact on said tube; a contact on said stem adapted to engage the contact on said tube, but normally spaced therefrom when the pressure existing in said tire is above a desired minimum; a bracket on said tube; a lever pivotally mounted on said bracket and having one end thereof engaged with said stem; and a weight on the other end of said lever, whereby the effect of centrifugal force on said stem when said wheel is rotated is neutralized.

5. A pressure responsive switch for the tire on a wheel of a vehicle adapted to energize indicating means within said vehicle, including: tube means mounted on said wheel; means within said tube adapted to be acted upon by the pressure existing within said tire; a pair of contacts adapted to change their relationship when said means moves as a result of a variation in pressure in said tire; and means operatively connected to the means within said tube and responsive to centrifugal force for neutralizing the effect of centrifugal force on said last mentioned means when said wheel is rotated.

RAY E. WALTERS.
CLARENCE E. RUCH.